United States Patent
Willett et al.

(10) Patent No.: US 11,372,991 B1
(45) Date of Patent: Jun. 28, 2022

(54) DATABASE OPERATIONAL CONTINUITY

(71) Applicant: Amazon Technologies, Inc., Seattle, WA (US)

(72) Inventors: Dallas Lamont Willett, Albuquerque, NM (US); Prashant Bondada, Bothell, WA (US); Michael G. Rascher, Vancouver (CA); Slawomir Sobon, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 453 days.

(21) Appl. No.: 16/201,741

(22) Filed: Nov. 27, 2018

(51) Int. Cl.
| | |
|---|---|
| G06F 21/62 | (2013.01) |
| G06F 21/30 | (2013.01) |
| G06F 16/27 | (2019.01) |
| G06F 16/23 | (2019.01) |
| H04L 9/40 | (2022.01) |
| G06F 11/14 | (2006.01) |

(52) U.S. Cl.
CPC ...... *G06F 21/6218* (2013.01); *G06F 11/1469* (2013.01); *G06F 16/2379* (2019.01); *G06F 16/273* (2019.01); *H04L 63/102* (2013.01); *G06F 2201/84* (2013.01)

(58) Field of Classification Search
CPC .... G06F 21/6218; G06F 21/62; G06F 16/273; G06F 16/27

USPC .................................. 713/165, 193; 726/28
See application file for complete search history.

(56) References Cited

U.S. PATENT DOCUMENTS

| | | | |
|---|---|---|---|
| 8,990,264 | B2 | 3/2015 | Clayton et al. |
| 9,734,021 | B1 | 8/2017 | Sanocki et al. |
| 2004/0267835 | A1 | 12/2004 | Zwilling et al. |
| 2011/0093435 | A1 | 4/2011 | Zha et al. |
| 2014/0108352 | A1 | 4/2014 | Ahrens et al. |
| 2014/0351214 | A1* | 11/2014 | Abercrombie ........ G06F 16/137 707/626 |
| 2016/0321339 | A1 | 11/2016 | Tekade et al. |
| 2017/0060699 | A1 | 3/2017 | Hohl et al. |
| 2019/0095455 | A1 | 3/2019 | Barreto et al. |

FOREIGN PATENT DOCUMENTS

WO    WO-2014013437 A2 *   1/2014  ............ G06Q 10/10

* cited by examiner

*Primary Examiner* — Izunna Okeke
(74) *Attorney, Agent, or Firm* — Davis Wright Tremaine LLP

(57) ABSTRACT

A distributed system responds to a request to enable a restoration capability for a database instance by beginning a process for replicating configuration and transaction data for the database instance. The system associates the replicated configuration and transaction data with a first account and a second account, and prevents termination of the replication process except where consent for the termination is provided by both accounts. In response to a request to restore the database instance, the distributed system accesses the configuration and transaction data using the second account.

20 Claims, 9 Drawing Sheets

DATABASE OPERATIONAL CONTINUITY

BACKGROUND

A database management system may rely on failover to improve the availability and reliability characteristics of the system. Failover refers to the automatic or manual switching from a primary database instance to a standby database instance. For example, if a primary database instance fails, a database management system may react to the failure by having a standby instance take over the functions previously performed by the primary database instance.

In such systems, the standby database instance operates as a mirror, or replica, of the primary database instance. In order to maintain a complete copy of the data maintained by the primary database instance, the standby database instance processes the same transactions processed by the primary database instance. Typically, the primary database instance transmits a record of each transaction it has performed, or is about to perform, to the standby instance. The standby instance may then process the transaction, thereby keeping its copy of the data up-to-date.

However, if a malicious actor is able to compromise an account associated with the operation of the primary database instance, the capability of the database to continue to operate may be called into question, despite the presence of the standby. This may be due to interference, by the malicious actor, with the operation of the primary database instance or the standby instance.

BRIEF DESCRIPTION OF THE DRAWINGS

Various techniques will be described with reference to the drawings, in which.

DETAILED DESCRIPTION

Figure 1:
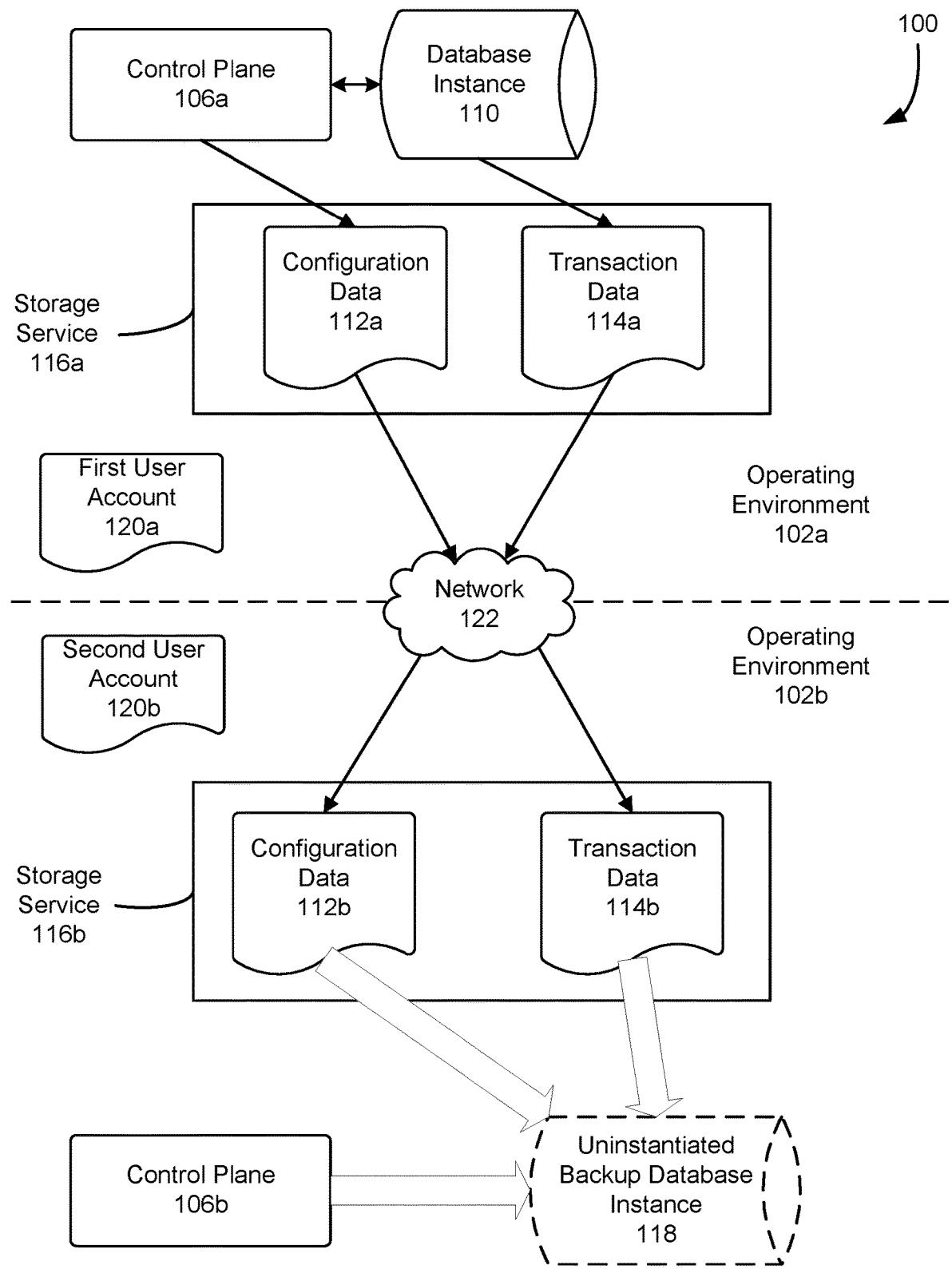
FIG. 1 illustrates a distributed system supporting point-in-time restore with operational continuity safeguards, in accordance with an embodiment.

Described herein are systems and methods for safeguarding operational continuity when a database instance is restored. Database management systems may be configured to rely on failover to improve reliability and availability. Typically, such systems have a standby database node configured as a mirror or replica of a primary database node. The primary database node may, for example, transmit a record of each transaction it has performed, or is about to perform, to the standby node. The standby node may then process the transaction in the same manner as the primary node. In the event that the primary node fails, or is taken offline for maintenance, the secondary node thereby has an up-to-date copy of the data and can take over the role of the primary node. However, there are drawbacks to this approach: operating the standby node consumes power and computing capacity, and there may be licensing costs associated with the operation of the standby node. These technical and monetary costs may be incurred even though the standby node may be used only infrequently.

Another issue related to the failure or compromise of a database is operational continuity. Here, compromise refers to a situation in which the integrity of the database has become suspect. This might occur, for example, if a malicious actor were able to compromise, (e.g., hack into) an account under which a database instance operates. The database instance might be restored to a point prior to the compromise, in order to ensure that data corrupted by the malicious actor were not used. However, the malicious actor might also have been able to compromise the live backup instance or replica, and thereby interfere with the ability to do a point-in-time restoration.

Operational continuity refers to the ability to continue the operation of a database instance in the event that an associated account is compromised. In general terms, operational continuity is maintained if the restored database is able to resume operations in substantially the same manner as it was operating prior to the restoration, even if some data is lost. For example, the database might be restored such that all data prior to an indicated point is restored. The indicated point might correspond, for example, to some time prior to when an associated account was compromised. In some instances, operational continuity may also refer to the ability to continue the operation of a both a database instance and one or more client applications that are dependent on the database instance. Described herein are operational continuity safeguards that help to ensure that a database instance, if compromised, can be restored in a manner consistent with maintaining operational continuity.

Further, a distributed system may provide a point-in-time restoration capability without instantiating a standby node. Technical and monetary costs associated with the standby node are therefore avoided. The example distributed system may, for example, begin metering capacity utilized by a restored instance when such an instance is restored. Prior to that point, the technical and monetary costs associated with providing the restoration capability may be less than would be incurred by operating a standby database. Moreover, operational continuity safeguards as described herein may protect the capability to perform the restoration in the event that an account associated with the primary database instance is compromised.

Provision of the restoration capability may comprise replication between operating environments. The replication involves data that represents the transactions processed by the primary database instance, as well as configuration data. The transaction data can include snapshots, baselines, or image files of a collection of data maintained by the primary database instance, as well as data pertaining to individual transactions. For example, for a given object, a complete set of transaction data might include a snapshot of the object and a record of any changes, additions, or deletions to the object that occurred subsequent to the snapshot. A transaction may refer to an operation on the data, such as an insert, update, or delete operation. A transaction may also refer, in some cases, to sets or collections of such operations. The replicated configuration data can include aspects of the configuration of the operating environment on which the primary database instance is dependent. These aspects include, but are not limited to, configuration settings for the database itself, such as schema of the database, user-defined functions, credentials, and so forth. The replicated configuration data may also include configuration settings that are relevant to clients of the primary database instance. For example, client applications may rely on the database being localized to a particular jurisdiction, or dependent on the database conforming to a particular version of a schema. The replicated configuration data can also include aspects of the operating environment such as network settings, user accounts, virtual machine configurations, and so on.

Replicating the transaction data and configuration data between operating environments facilitates the provision of a point-in-time restoration capability. An operating environment refers to a combination of components and devices, connected by a network, which collectively perform a computing function. Operating environments may be isolated from each other in a manner that reduces the risk that a failure in one operating environment would be repeated in another. For example, a power failure in one operating environment is not likely to affect another operating environment in a distant geographic location. This example should not, however, be viewed as limiting the scope of the present disclosure to only those embodiments in which operating environments are located at different geographic locations. Moreover, in some cases and embodiments, separate operating environments can share physical components, such as networking devices, computing devices, routers, and so on.

Replication of the transaction and configuration data may be accomplished via the use of a distributed storage service, which may also be referred to herein as a storage service. A distributed storage service comprises computing devices and components that, collectively, provide scalable storage infrastructure. A distributed storage service may further provide replication features suitable to replicate transaction and configuration data between locations accessible to a source operating environment, in which a primary database instance executes, and a target operating environment, in which the primary database instance may, upon request, be restored.

Replication is one example of a technique that may be employed, in various embodiments, to preserve the transaction and configuration data associated with a database instance and its operating environment. Preservation of this data can also involve, in the alternative, associating configuration and transaction data with two or more owners without replicating the data, encrypting the data, archiving the data, and so on.

In an example, operational continuity safeguards comprise systems and procedures for linking the accounts associated with the database instance and the point-in-time restoration capability. In a distributed system, a user account is associated with an operating environment. A database instance executes in the first operating environment under this account. In providing the point-in-time restoration capability, the distributed system links this first user account with a second user account associated with a second operating environment. Both accounts are accessible to the same entity, but use different credentials so that a compromise of the first account will not result in a compromise of the second account. Data produced by the database instance and related to its operation—including transaction data and configuration data—is replicated to the second operating environment. Moreover, the distributed system prevents the deletion and modification of this data unless it can confirm the consent of both accounts to the deletion or modification.

In a further aspect, the second user account may be protected by an escrow feature. This may comprise providing partial control over the account to a trusted party. For example, a service provider may provide a feature in which credentials for the second user account are stored in an escrow account. Access to the escrow account can be controlled in a variety of ways, such as a tertiary set of credentials or multi-factor authentication.

In an example, system comprises at least one processor and a memory that stores computer-executable instructions that, in response to being executed by the at least one processor, cause the system to obtain a request to enable a restoration capability for a database instance. The database instance is associated with a first account. In response to obtaining the request, the system initiates replication of configuration and transaction data pertaining to the database instance, and stores information associating the replicated configuration and transaction data with a second account. The configuration and transaction data is replicated to a second operating environment. The system prevents the replication from terminating unless and until it obtains authorization from both the first and second accounts. In response to a request to instantiate a replica of the database instance, the system restores the database using the replicated configuration and transaction information.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. In some embodiments, the computing capacity consumed to provide a point-in-time restore capability is reduced. In some embodiments, the technical and monetary costs of maintaining an operational standby database are reduced or eliminated. In some embodiments, greater flexibility regarding the location of a restored database is provided. Moreover, as described herein, some or all of these advantages may be achieved in combination with improved capability for maintaining operational continuity in the event that an account associated with a database instance is compromised.

FIG. 1 illustrates a distributed system 100 supporting point-in-time restoration with operational continuity safeguards, in accordance with an embodiment. In the example distributed system 100, a database instance 110 is operative in a first operating environment 102a, and can be restored by the distributed system 100 in a second operating environment 102b. The first operating environment 102a is associated with a first user account 120a, and the second operating environment 102b is associated with a second user account 120b.

A user account refers to a security principal used to authenticate access a computing function of the distributed system 100. A user account may be associated with a set of credentials, such as a user name and password combination. A user account, which may also be referred to as an account, may be associated with the operation of a database instance. Examples of such association include, but are not necessarily limited to, ownership of a collection of data maintained by the database instance, association with a security principal under which one or more threads of the database instance execute, association with administrative rights for the database, and so on. User accounts may also be associated with operating environments. Examples of such association include administrative and access rights.

In an embodiment, a user account may be used to perform a variety of operations related to the configuration and functioning of an operating environment, such as the depicted operating environment 102a in which the database instance 110 operates. The operations that may be performed on behalf of the first user account 120a include creating the database instance 110, accessing the database instance 110, configuring network and security settings of the operating environment 102a, and so forth. These operations may be performed by and logged by the control plane 106b.

In the example of FIG. 1, a second user account 120b is associated with the operating environment 102b in which the creation of a backup database instance may be requested. In this example, the operating environment is instantiated prior to the backup database instance 118. The second user account 120b can be used, prior to creating the backup database instance 118, to perform various operations in the second operating environment 102b. In some embodiments, however, the second operating environment 102b is not created until needed for instantiating the backup database instance 118. In these circumstances, the second user account 120b is still created, but is not yet explicitly linked to the second operating environment 102b.

Figure 6:
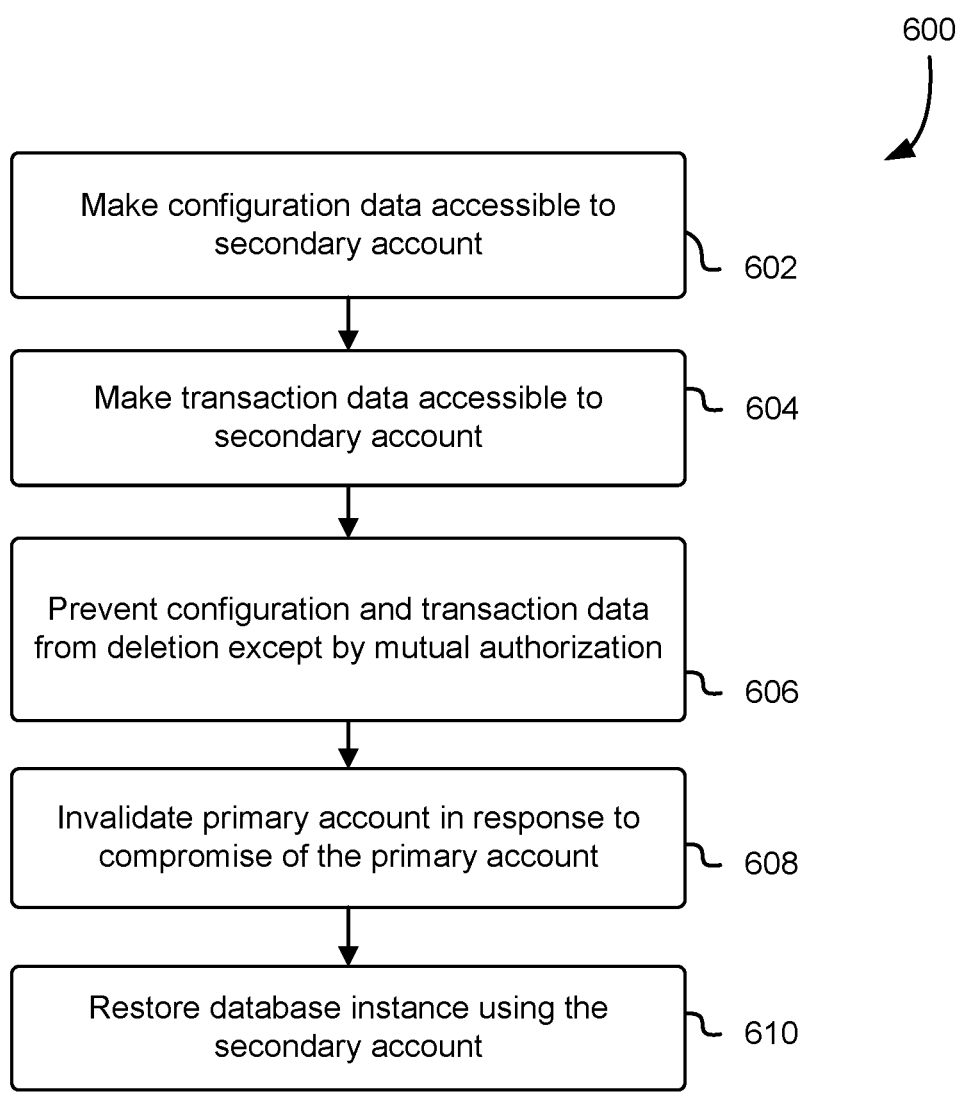
FIG. 6 is a flow diagram illustrating an example process for restoring a database instance based on operational continuity safeguards, in accordance with an embodiment.

An operating environment refers to a combination of components and devices, connected via a network, which collectively perform a computing function. As depicted in FIG. 1, operating environments 102a, 102b may be isolated from each other. For example, the components and devices in 102a may be in geographic proximity with each other, for example at the same data center. The components within the operating environment 102a may be connected by a communications network that is relatively high-speed compared to the network 122 that connects the two depicted operating environments 102a, 102b. FIG. 6 depicts further aspects of an operating environment.

The operating environments 102a,b may, in some cases and embodiments, correspond to operating regions of the distributed system 100. For example, the components and devices of a first operating environment 102a may be located in a first geographic region, and the components and devices of a second operating environment 102b may be located in a second geographic region. The operating environments may be connected by a network 122, which may include any of various communications networks, including but not limited to the Internet, wide-area networks, mesh networks, fiber optic networks, wireless networks, satellite-based networks, powerline networks, and so on, individually and in various combinations.

In the example distributed system 100, control planes 106a,b perform operations to coordinate the activities and operation of components within their respective operating environments 102a,b. In an embodiment, a control plane 106 comprises a module installed on an application server, such as the control plane and application server depicted by FIG. 6. A module, as used herein, refers to processor-executable instructions stored in a non-transitory memory of a computing device. The instructions, when executed by at least one processor of the computing device, cause the computing device to perform at least the described operations of the module.

Examples of operations performed by a control plane 106 include configuring networks within an operating environment 102a,b allocating and configuring hardware devices, including computing devices, allocating and configuring virtual machines, installing software on the virtual machines, and so forth. Further operations of the control plane 106 can include, in various embodiments, enforcing compliance with access policies related to ensuring operational continuity in the event that a user account is compromised. For example, the control plane 106 can ensure that configuration changes related to operational continuity, including restoration capabilities, are not terminated without mutual authorization from the primary and secondary accounts.

A control plane 106a in the first operating environment 102a controls and monitors execution of a database instance 110. The database instance 110 is in the same operating environment 102a as the control plane 106a. The controlling and monitoring may comprise monitoring and record information about the configuration of the database instance 110. This can include information about the storage devices used by the database, database account information, and so on. It can also include preventing configuration changes to the database, where those changes might interfere with the replication of transaction data, or otherwise interfere with the ability to do a restoration of the database instance. These types of changes can be prevented by the control plane 106a, except when the control plane is able to obtain authorization for the change from both of the first and second accounts 120a,b.

The control plane 106a may also control and monitor the operating environment 102a for changes to aspects of the configuration of the operating environment. The control plane 106a may monitor and record information concerning aspect of the operating environment 102a on which the database instance 110 depends. This may include information on which replication depends. Examples of configuration information which might be monitored and recorded include, but is not limited to, routing tables, domain name service entries, virtual private network settings, encryption keys, and so on.

In the example illustrated by FIG. 1, the control plane 106a receives a request to enable a point-in-time restoration capability for the database instance 110. A point-in-time restoration capability refers to an ability to restore a database instance such that the data managed by the restored database instance is up-to-date as of an indicated time. For example, if the database instance 110 were to crash, a client might request that the database instance 110 be restored with data that was current as of the time of the crash. Having a point-in-time restoration capability does not necessarily require that all data from the initial database instance 110 be available. However, the distributed system 100 may ensure that a point-in-time restoration will likely be able to restore all relevant data within a threshold range of a requested time, so that the restored database instance can effectively act as a replica or replacement of the original database instance.

In the example distributed system 100, point-in-time capability is provided without a live backup instance. The backup database instance 118 may therefore remain uninstantiated until a point-in-time restoration is requested. This approach reduces the costs of providing the point-in-time restoration capability, in both technical and monetary aspects. For example, prior to a restoration, no processors need to be allocated for executing a backup database instance, or processing transactions. Database licensing costs may also be reduced, since in distributed system 100 the backup database is not instantiated unless a restoration is requested. Instantiation refers to the process of creating the database instance. An instantiated database instance is therefore a database instance that has been created or made operational.

The control plane 106a responds to the request to enable point-in-time restore capabilities by causing configuration data 112a and transaction data 114a to be written to a storage location. In the example of FIG. 1, the control plane 106a causes the configuration data 112a and transaction data 114a to be written to the storage service 116a.

The configuration data 112a comprises data pertaining to or describing the operating environment 102a and the database instance 110, particularly data relating to configuration of the operating environment 102a, include the configuration of the database instance 110. For example, the configuration data 112a can include details about the configuration of the operating environment 102a on which the database instance 110 depends. Examples of configuration data include, but are not limited to, virtual machine images, database snapshots, user credentials, account credentials, digital certificates, network settings, virtual private network ("VPN") settings, operating system patches, registry entries, and so on. Further examples include storage device settings, storage service properties, database schemas, and so on. In general, the configuration data 112a includes any information that is to be restored in the event that a backup database instance 118 were to be instantiated. This may include whatever settings might be desired or needed to ensure that the backup database instance 118 can operate effectively as a replacement for the primary database instance 110.

The transaction data 114a comprises records of transactions performed by the database instance 110. The transaction data 114a may include a transaction log. A transaction log is a record of the operations performed by a database. Typically, a transaction log is ordered by the time at which the operations were performed. A transaction log can be replayed to a database in order to repeat operations that were recorded in the transaction log but never committed to the data managed by a database instance, such as the depicted database instance 110. The transaction data 114a can also include a snapshot of the database.

The control plane 106a causes at least a subset of data from the transaction log of the database instance 110 to be written to the storage service 116a. This transaction data 114a can include records of transactions subsequent to a snapshot of the database instance 110. Although not explicitly illustrated in FIG. 1, the control plane 106a may also cause a snapshot of the database instance 110 to be written to the storage service. Here, the snapshot refers to a baseline version of the collection of data that is managed by the database instance 110. Together, the transaction data 114a and the snapshot can be used, as described herein, to reconstruct the data state of the database instance 110 at a requested point in time.

Figure 2:
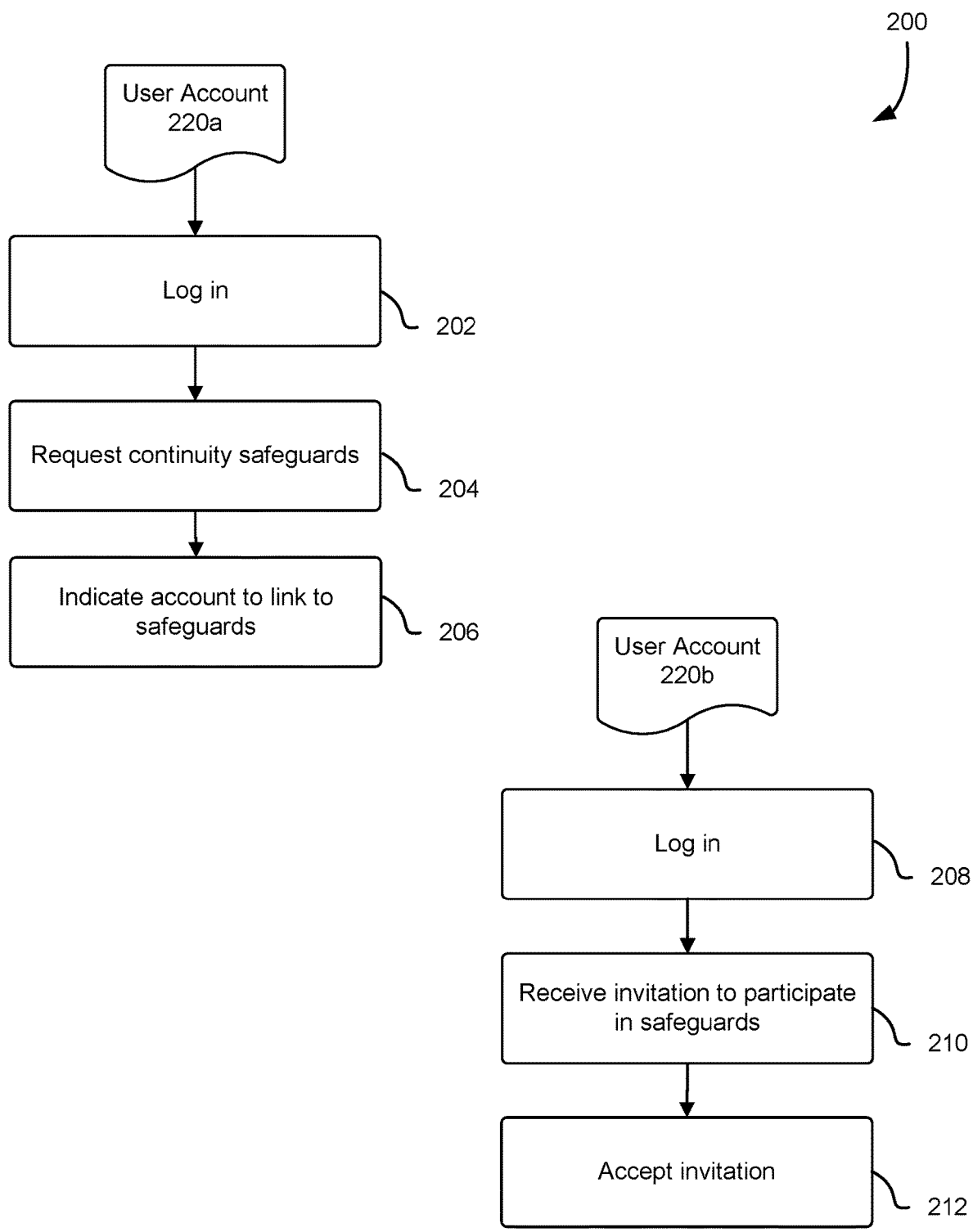
FIG. 2 is a flow diagram illustrating aspects of an interface for enabling operational continuity safeguards, in accordance with an embodiment.

In some instances, the database instance 110 writes data to a storage device that is not replicated. In such instances, the control plane 106a reads the transaction data 114a from this storage device and sends it to the storage service 116a. This process of replication is ongoing once started in response to the request to enable a point-in-time restore capability. FIG. 2 provides describes further aspects of copying and replicating the transaction data 114a.

In an embodiment, the storage service 116a is independent of the operation of the database instance 110, and possibly independent of the operating environment 102a. For example, the storage service 116a might, instead of being part of the operating environment 102a, be an Internet-based storage service that is accessible to the control plane 106a in the operating environment 102a.

In an embodiment, the storage service 116a comprises scalable infrastructure for data storage. For example, a storage service 116a can comprise a control plane that is similar though not necessarily identical to the control plane 106a, a plurality of application servers such as the application server depicted in FIG. 6, and a plurality of storage devices.

The storage service 116a is accessible to other components and devices within the operating environment 102a, and is also connected via the network 122 to a comparable storage service 116b in another operating environment 102b. The data stored by the storage service, e.g., the configuration data 112a and transaction data 114a, is therefore accessible to both the control plane 106a in the first operating environment 102a and the control plane 106b in the second operating environment 102b.

Data maintained in the storage service 116a of the first operating environment 102a is replicated to the storage service 116b in the second operating environment 102b. In some embodiments, the replication is performed by the storage services 116a,b, using replication modules operative as components of the storage services 116a,b within each respective operating environment 102. The replication modules, which may be operative on an application server such as those depicted in FIG. 6, communicate with each other via the network 122. The replication module in the first operating environment 102a reads data from storage devices of the storage service 116a and transmit the data to the replication module in the other operating environment 102b. There, the replication module in the second operating environment 102b stores the data on storage on devices of the storage service 116b in the second operating environment 102b.

Although not explicitly depicted in FIG. 1, some embodiments may utilize replication modules similar to those just described, but which operate independently of the respective storage services 116a,b in the operating environments 102. In such embodiments, a replication module in the first operating environment 102a transmits data from the storage service 116a in the first operating environment to the replication module in the second operating environment 102b. The replication module in the second operating environment 102b then causes the received data to be stored by the storage service 116b in the second operating environment.

Although not explicitly depicted in FIG. 1, in some cases a plurality of storage devices may be used in place of the respective storage services 116 in each of the operating environments 102. In such cases, a control plane coordinates utilization of the storage devices, and a replication module in the first operating environment 102a transmits data to a replication module in the other operating environment 102b.

The replicated data can comprise the configuration data 112b and transaction data 114b. A snapshot of the database can also be replicated to the second operating environment 102b. Regardless of whether the replication is done by the storage services 116a,b or done independently, these components may be replicated independently of the operation of the database instance 110. It may, however, be advisable to tune the speed of replication in accordance with target times for restoration. Lag in the replication process may delay instantiation and restoration of a backup database instance, or limit how up-to-date the point-in-time restoration may be.

A control plane 106b in the second operating environment may receive a request to restore the database instance 110. In general terms, the restoration process involves the various steps and/or operations needed to instantiate a backup database instance 118, and to restore the data maintained by the primary database instance 110. As described above, the backup database instance 118 is not instantiated until such a request is received. As such, it may be the case that the only technical costs associated with the provision of the point-in-time restore capability are those costs associated with storage and data replication. Here, costs refer primarily to the consumption of computing or other technical resources.

The control plane 106b may receive the request to restore the database instance 110 from a control plane 106a in the other operating environment 102a, or from a message triggered by a user interface or application programming interface ("API"). Although not explicitly depicted in FIG. 1, a user interface or API may be provided to allow for the submission of a request to enable point-in-time restore capabilities, and to allow for the submission of a request to initiate a restoration process. The user interface may communicate these instructions to control plane 106a or control plane 106b. Note that the capabilities and functioning of the user interface, particularly with respect to requesting that a database instance be restored, should be available to a client even in cases where the first operating environment 102a is unavailable. Thus, in at least some embodiments, the control plane 106b can receive a request to restore a database instance even when the first operating environment 102a is unavailable.

In response to the request to restore the database instance 110, the control plane 106b in the second operating environment performs operations to configure the operating environment 102b to support the backup database instance 118, installing and activating the backup database instance 118 on a virtual machine, configuring the backup database instance 118, obtaining database snapshots (if available), and replaying the transactions log data 114b to restore the data state of the primary database instance 110 to the backup database instance 118.

Note that although the term restore is used with respect to the process for instantiating the database instance 110, there may be cases where the database instance 110 remains available and/or operative after the backup database instance is instantiated. Thus, the term restoration does not necessarily imply that the primary database instance 110 has failed, been interrupted, or has ceased to exist. Instead, the term restore refers to creating a copy of the primary instance, with data that is current up to an indicated point in time, regardless of the current state of the primary database instance 110.

As used herein, a database instance refers to a module for performing the functions of a database and a collection of data on which the module performs those functions. In various embodiments, the collection of data is owned either by a single entity, or by a single tenant of a multi-tenant database system. A multi-tenant database system is one in which data owned by a number of entities is managed by a single database, or by a plurality of databases which are collectively managed and owned by a plurality of entities. In the case of a multi-tenant database, a database instance generally refers to the module and the collection of data owned by a particular tenant, or to a set of tenants for whom a point-in-time restore capability is being enabled.

FIG. 2 is a flow diagram illustrating aspects of an interface for enabling operational continuity safeguards, in accordance with an embodiment. Although the example 200 of FIG. 2 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The operations depicted by FIG. 2 are done in association with two user accounts 220a,b. In an embodiment, the actions associated with a first user account 220a are performed through a user interface aspect of a web-based application. For example, the web server 906 depicted in FIG. 9 can provide a user interface through which an entity may manage the operating environments and database instances depicted in FIG. 1.

At 202, entity uses the user interface to log in to the first user account 220a. For example, the entity may access the user interface and, at a log-in page, provide a user name and password associated with the first user account 220a. The provided credentials may then be authenticated and used by the distributed system to perform various actions, including those depicted in steps 204, 206 of FIG. 2. In an embodiment, a control plane receives the credentials and invokes an authentication service to validate the credentials.

At 204, the entity may request, through the user interface, that operational continuity safeguards be enabled for a database instance, such as the database instance depicted in FIG. 1. This may be done, for example, by selecting an option associated with the configuration of the database instance.

At 206, the entity may request, through the user interface, an account to which the operational safeguards are to be linked. For example, the entity may interact with the user interface to create and the second user account 220b and designated it as the linked account. Alternatively, the entity may interact with the user interface to select the second user account 220b from a list of accounts that were previously created.

At 208, the entity may interact with the user interface to log into a second user account 220b. This may be through user interface elements similar, or identical, to those employed by the entity to log in to the first user account. The credentials of the second user account may be validated through procedures similar to those described regarding the first user account 220a.

At 210, the entity may receive, through the user interface, an invitation for the second account to participate in the operational continuity safeguards. For example, after logging in to the second user account 220b, the entity may be presented with a notification indicating that the first user account 220a has requested the enablement of operational continuity safeguards, and indicated that the second user account 220b should be the linked account associated with those safeguards.

At 212, the entity may interact with the user interface to accept the invitation. For example, the entity may respond to the notification by clicking on an 'accept invitation' button presented by the user interface in response to the request.

In some embodiments, certain of the operations depicted in FIG. 2 are facilitated by the operation of a control plane, such as the control planes 106a,b depicted in FIG. 1. In an embodiment, a control plane stores and secures information related to the first and second user accounts 220a,b. For example, the control plane might store information for each user account tagged or otherwise associated with a security principal corresponding to one of the user accounts 220a,b. In response to step 206, in which the entity requests that the second user account be linked to the first user account, the control plane stores information accessible to the second user account indicating that the link has been requested.

Note that although the steps and operations of FIG. 2 have been described in relation to a user interface, alternative embodiments may also employ programmatic interfaces, in whole or in part. For example, interfaces may be provided to perform authentication, to request that continuity safeguards be enabled, and to accept an invitation to participate in an operational continuity safeguard.

Figure 3:
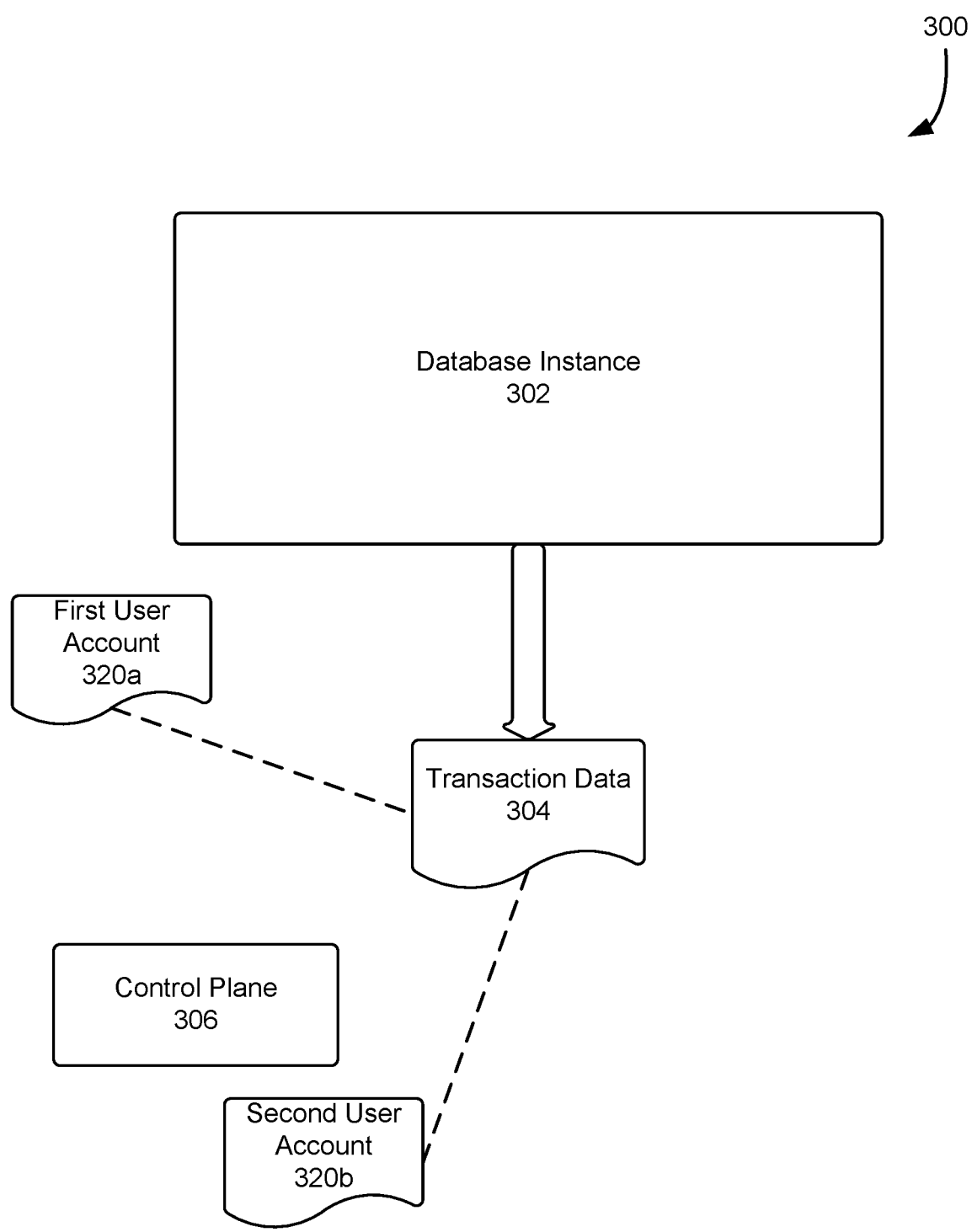
FIG. 3 illustrates aspects of operational continuity safeguards for transaction data, in accordance with an embodiment.

FIG. 3 illustrates aspects of operational continuity safeguards for transaction data, in accordance with an embodiment. In the example 300 of FIG. 3, a database instance 302 operates to store and retrieve data. In various embodiments, the database instance 302 in FIG. 3 corresponds to the database instance 110 depicted in FIG. 1.

The database instance 302 may process various transactions, such as those associated with insert, update, and delete operations. The database instance 302 generates transaction data 304 when these operations are performed. Transaction data 304 comprises a record of the transactions performed by the database instance 302 on the collection of data.

The database instance 302 is associated with the first user account 320a. In this context, association refers at least partly to ownership of a collection of data maintained by the database instance 302, and of the transaction data 304 that is generated by the operation of the database instance 302. As noted, this data describes operations performed on the collection of data. As depicted in FIG. 3, this data is owned by the first user account 320a.

In response to a request to enable operational continuity safeguards, a control plane 306 may cause the transaction data 304 to be recorded as owned by the second user account 320b, in addition to being owned by the first user account 320a. When data is owned by both accounts, the control plane 306 requires consent indications from both accounts in order to modify or delete the data.

In various embodiments, the transaction data 304 is replicated between operating environments. The control planes of the respective operating environments may ensure that the transaction data 304 is jointly owned in each respective operating environment by at least two accounts. For example, in some embodiments the control plane 306 stores the transaction data on storage service, such as the storage services 116a,b depicted in FIG. 1. When storing the data, the control plane may leverage features of the storage service to specify that the data is jointly owned and to request that mutual authentication be obtained prior to deleting the data.

Figure 4:
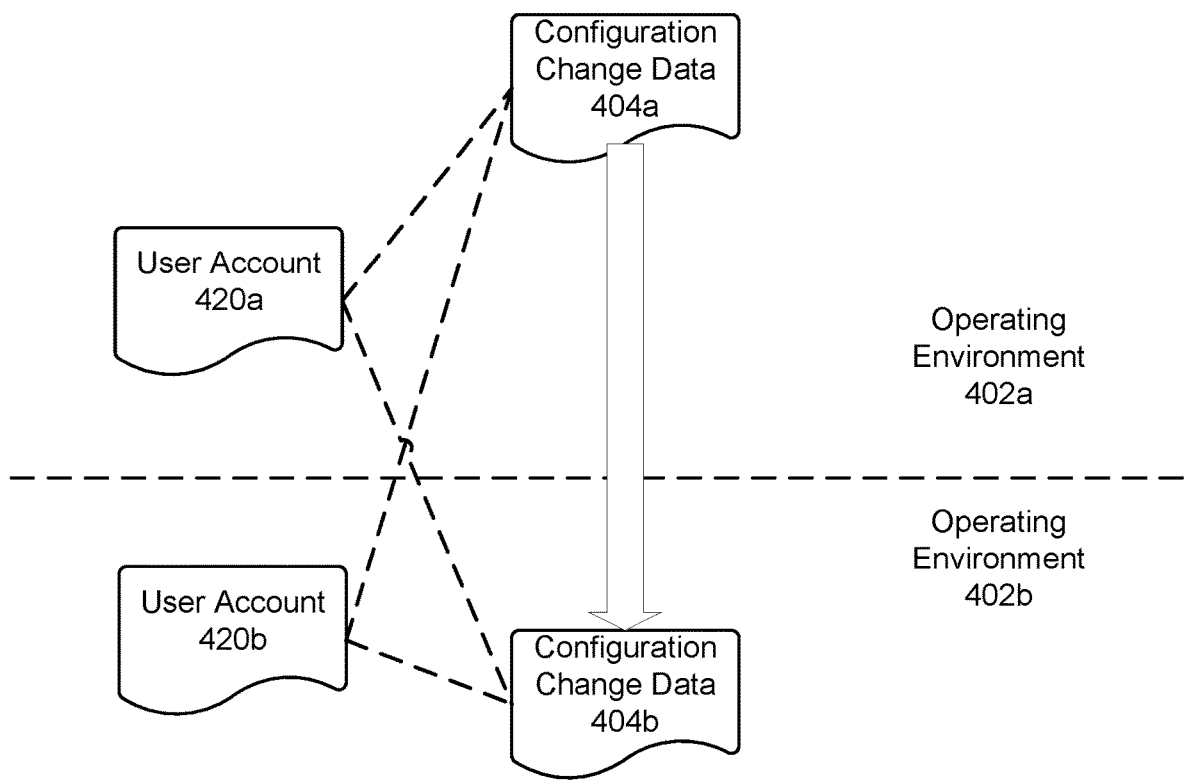
FIG. 4 illustrates aspects of operational continuity safeguards for configuration change data, in accordance with an embodiment.

FIG. 4 illustrates aspects of operational continuity safeguards for configuration change data, in accordance with an embodiment. In the example of FIG. 4, configuration changes are made on behalf of a first user account 420a in a first operating environment 402a. A control plane in the first operating environment records the configuration changes. In FIG. 4, this data is depicted as configuration change data 404a. Configuration change data 404a can comprise logs of the configuration changes made in the first operating environment 402a.

The control plane in the first operating environment 402a configures ownership of the configuration change data 404a. In particular, the control plane associates the configuration change data 404a with both the first user account 420a and a second user account 420b. The control plane further ensures that the data, when owned by both user accounts 420a,b, cannot be modified or deleted without consent being provided from both accounts 420a,b.

In various cases and embodiments, the configuration change data 404a in the first operating environment 402a is replicated be replicated to a second operating environment 402b. When replicated to the second operating environment 402b, the configuration change data 404b is kept jointly owned by both the first user account 420a and the second user account 420b. Accordingly, the control plane in the second operating environment prevents the configuration change data 404b from being deleted or modified without consent from both user accounts 420a,b. Note that joint ownership of the data may be severed in the event that the first account is compromised. However, the distributed system may still provide mechanisms to ensure that consent is provided by both the second account and an additional verification mechanism.

Figure 5:
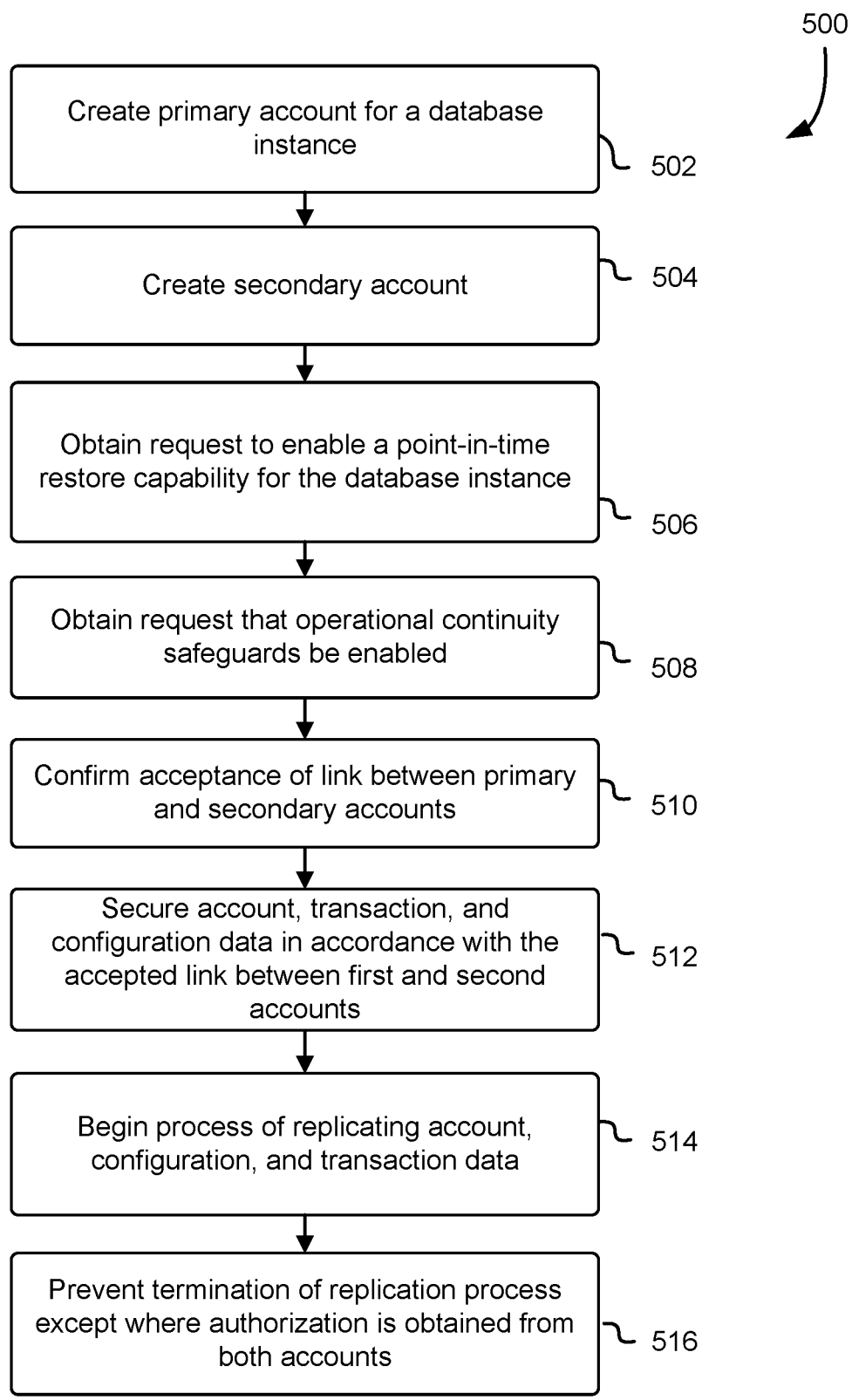
FIG. 5 is a flow diagram illustrating an example process for establishing operational continuity safeguards for a database instance, in accordance with an embodiment.

FIG. 5 is a flow diagram illustrating an example process for establishing operational continuity safeguards for a database instance, in accordance with an embodiment. Although the example 500 of FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 502, the distributed system creates a primary account for a database instance. Here, the primary account refers to an account that may be treated as an owner of a collection of data managed by the database instance. For the example, the database instance may execute in a first operating environment under the primary account.

In an example distributed system, such as the example depicted by FIG. 1, a control plane manages accounts and account credentials. However, in some cases, an identity management service is used to manage accounts and account credentials.

In an embodiment, the primary account is created in response to a request from an entity to create the account. The request may be received through a user interface or a programming interface and processed by the control plane or an identity management service. The account may then be associated with one or more operating environments.

In an embodiment, the primary account is created in response to a request from an entity to create an operating environment. The request may be received through a user interface or a programming interface and processed by the control plane or an identity management service. The account may be configured upon creation to be associated with the requested operating environment.

In various embodiments, such as the embodiment of a distributed system depicted in FIG. 1, a control plane manages operations performed on components or data of an operating environment, such as database instances, network settings, and so forth.

At 504, the distributed system creates a secondary account. In embodiments, the secondary account is created by a control plane or identity management service using a process similar or identical to those described regarding the primary account. In other embodiments, the second account is created automatically by the control plane.

In some cases and embodiments, the secondary account is associated with an operating environment that is active and instantiated. For example, in FIG. 1, the secondary user account 120b may be associated with the second operating environment 102b, which is depicted as having been instantiated prior to the instantiation of the backup database instance 118.

In other cases and embodiments, the secondary account is not associated with an instantiated operating environment. However, the secondary account is still usable and might be used in a manner similar to how the primary account might be used. For example, an entity authorized to use the secondary account might use it to create operating environments, configure database instances, and so on.

At 506, the distributed system receives or otherwise obtains a request that a point-in-time restoration capability be enabled for the database instance. In embodiments, obtaining a request comprises receiving a message transmitted over a network. In other embodiments, obtaining a request comprises receiving a message at an input of a module. For example, a control plane module might have an interface through which it receives invocations of a programming interface that contain a message requesting that the capability be enabled.

Figure 7:
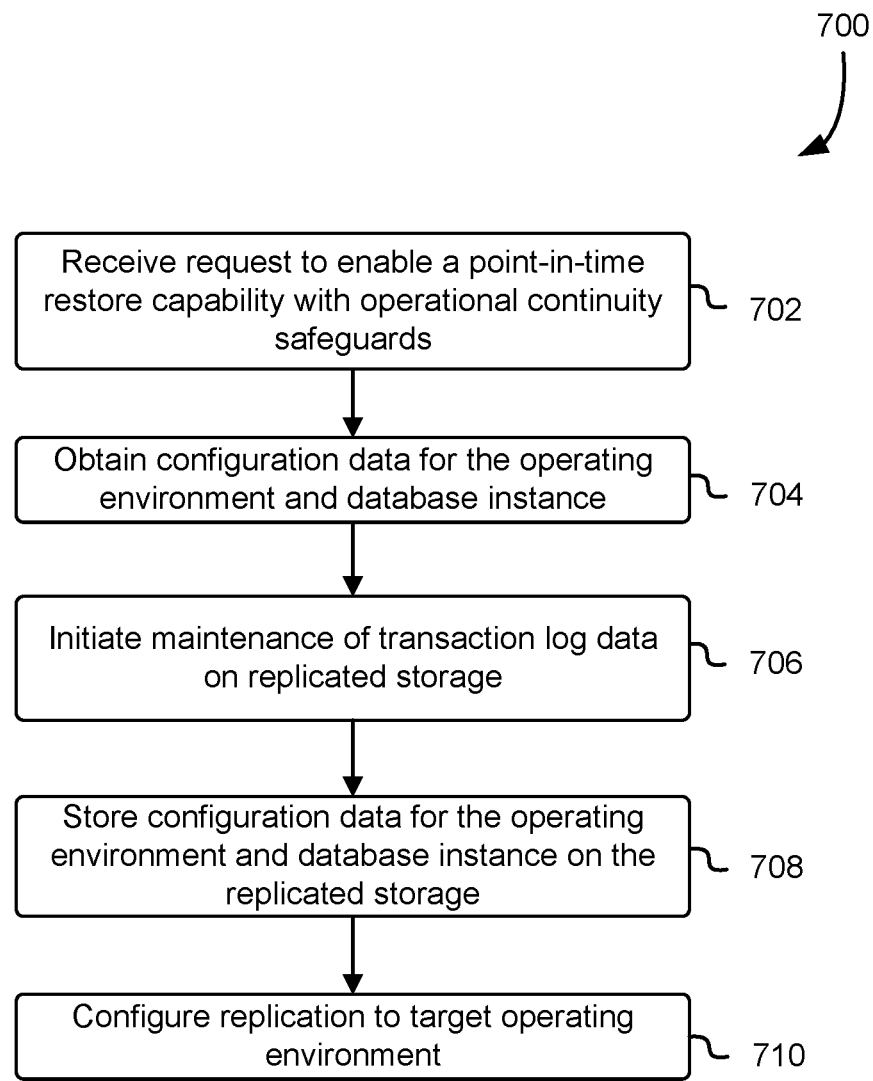
FIG. 7 is a flow diagram illustrating an example process for enabling a point-in-time database restoration capability, with delayed instantiating of the backup instance, in accordance with an embodiment.

Steps and operations for enabling a point-in-time restoration capability are described herein. FIG. 7 provides one example of enabling a point-in-time restoration capability for a database instance.

At 508, the distributed system obtains a request that operational continuity safeguards be enabled for the database instance. This request may be received in conjunction with the request to enable a point-in-time restoration, or it might be received separately.

At 510, the distributed system confirms acceptance of a link between the primary and secondary accounts. For example, in an embodiment, a procedure in accordance with the following is performed. The distributed system stores information in each account record that indicates that confirmation is requested. This may be done by the control plane. The distributed system then processes a login sequence for the primary account. The distributed system then determines, based on the stored information, that a confirmation has been requested. The distributed system can then present, to the entity that owns the primary, a user interface through which the entity can consent to the proposed linkage. These steps can, for example, be performed by a web server and application server, such as those depicted in FIG. 9. The system can then receive, via the user interface, an indication that the linkage has been accepted by the primary account. A similar process can then be repeated for the secondary account. The link between the two accounts is confirmed when acceptance has been indicated for both accounts.

In an embodiment, steps and operations similar to those just described are performed using a programmatic interface instead of a user interface. For example, a web service implemented using a web server and application server, such as those depicted in FIG. 9, might provide interface(s) that accept account name, account credentials, and information indicating that a pending linkage request should be accepted for the given account.

At 512, the distributed system secures account, transaction, and configuration data in accordance with the accepted link between the first and second accounts. In this context, securing the data refers to protecting the data from modification or deletion except by consent obtained from both accounts.

The secured account data can include attributes of the account that are related to operational continuity. For example, the secured account data can include records referring to the enablement of the operational continuity safeguards and the linkage between the primary and secondary accounts. There may also be cases where other features of the account, such as an amount of provisioned throughput, is also protected from modification or deletion without consent obtained from both accounts.

The secured transaction data can include snapshots of the database instance and transactions logs generated by the database instance. As explained herein, the snapshot and transaction data is used, in various embodiments, to restore the data maintained by the database instance. Securing the snapshot and transaction data from modification or deletion thus helps protect operational continuity in the event that the primary account is compromised. If the primary account is compromised, the transaction data cannot be deleted without consent from the secondary account, and the secondary account can still be used to access and restore the transaction data.

The configuration data can include logs or other records of configuration changes made to the database instance or to an operating environment. For example, the distributed system might maintain records of configuration changes made to the operating environment in which the database instance operates. These records can be protected from modification or deletion, except when mutual consent is obtained from both the primary and secondary accounts. In this manner, the records are made available to be applied to an operating environment in which the database instance is to be restored.

Note that in some instances, the distributed system may prevent configuration actions from being performed without authorization from the primary and secondary accounts, as opposed to only securing access to records of configuration changes. This may be done, for example, where a configuration change, if made, would impact the ability of the distributed system to subsequently perform a restoration of the database instance.

Embodiments may employ a variety of approaches to secure account, transaction, and configuration data. The various approaches may be applied individually, or in combination.

In an embodiment, secured data is stored on a file system and marked as owned by security principals corresponding to the primary and secondary accounts.

In an embodiment, secured data is stored on a file system and marked as owned by a security principal corresponding to a combination of the primary and secondary accounts.

In an embodiment, secured data is stored on a file system and marked as owned by a security principal corresponding to a system account.

In an embodiment, deletions and modifications of the secured data are performed by a control plane, or routed through a control plane to another component of the distributed system. Prior to permitting any modification or deletion of data, the control plane identifies the marked owners of the data and then seeks to obtain consent from the primary and secondary accounts to perform the modification.

In an embodiment, a storage service is used to store secured data. Data stored on the storage service is protected from being modified or deleted without dual authorization. This may be accomplished in a variety of ways.

In an embodiment, the storage service provides a programming interface that requires two sets of credentials to modify or delete a record stored by the service. In order to modify or delete data stored by the service, the control plane obtains the appropriate credentials, e.g., those corresponding to the primary and secondary accounts, and invokes the programming interface to perform the modification or deletion.

In an embodiment, the secured data is stored on the storage service in association with a third account that represents a combination of the primary and secondary accounts. A control plane manages this account, and permits it to be used to modify data only when it has obtained authorization from the primary and secondary accounts.

In an embodiment, a control plane manages access to the storage service, and permits modification and deletion of data stored by the service only when it has obtained authorization from the primary and secondary accounts.

In an embodiment, modification or deletion of account, transaction, or configuration data is accomplished through a procedure similar to that employed to obtain authorization to link the primary and secondary accounts. The distributed system stores information in each account record is indicative of the proposed modification or deletion. This may be done by the control plane. The distributed system then processes a login sequence for the primary account. The distributed system then determines, based on the stored information, that a confirmation of the requested action has been initiated. The distributed system can then present a user interface to the entity that owns the primary to allow the entity to consent to the proposed linkage. These steps can, for example, be performed by a web server and application server, such as those depicted in FIG. 9. The distributed system can then receive, via the user interface, an indication that the requested action has been approved by the primary account. A similar process can then be repeated for the secondary account. Once both accounts have provided consent, the control plane can perform the requested action, or cause the requested action to be performed.

At 514, the distributed system begins the process of replicating account, configuration, and transaction data. For example, in an embodiment, a control plane begins an ongoing replication process in which account, configuration, and/or transaction data needed to restore the database instance is replicated. In this context, the ongoing nature of the replication process refers to operations and procedures which occur continuously, semi-continuously, periodically, or in response to a relevant event, such as in response to a configuration change or to a transaction. In embodiments, the replication process is performed by a thread, application, or module. For example, a control plane may perform the relevant operations continuously, semi-continuously, periodically, or in response to a relevant event.

In some cases and embodiments, the account, configuration, or transaction data is not replicated. Instead, the data is stored by a storage service or on a storage device, such that the stored data is associated with both of the primary and secondary accounts, and such that authorization from both accounts is required in order to delete or modify the account, configuration, or transaction data.

At 516, the distributed system prevents termination of the replication process, except where authorization is obtained from both accounts. Thus, in the absence or lack of such approval, the distributed system protects against the modification of properties and attributes of the system which are associated with the replication. As noted above, the modification or deletion of account, transaction, or configuration data is controlled. As such, the distributed system can prevent account settings and configuration changes from being made without authorization from both of the primary and secondary accounts. Authorization can be obtained using the procedure described above for authorizing the modification of account, transaction, or configuration data. In general terms, the distributed system requires the credentials of both the first and second account in order to authorize termination of the replication process.

FIG. 6 is a flow diagram illustrating an example process for restoring a database instance based on operational continuity safeguards, in accordance with an embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

At 602, the distributed system makes configuration data accessible to the secondary account. In general, this involves ensuring that an operating environment associated with the secondary account has or will have access to the configuration data in the event that a restoration of the database instance is requested.

In an embodiment, the configuration data is replicated to a storage location accessible to the operating environment in which the database instance is to be restored, and the secondary account is authorized to access that data in that environment. In some instances, the access is performed by the control plane acting on behalf of the secondary account. The control plane may, for example, access the configuration data based on the credentials or identity of the secondary account.

In an embodiment, the configuration data is marked as owned by the secondary account, and read access to the data is granted to the secondary account. Thus, while modifying or deleting the data may require dual authorization, the data can be read by the second account without the authorization of the first account. In some instances, the access is performed by the control plane acting on behalf of the secondary account.

At 604, the distributed system makes transaction data accessible to the target account. In general, this involves ensuring that the data is accessible for restoring a database instance that will operate under secondary account.

In an embodiment, the transaction data is replicated to a storage location accessible to the operating environment in which the database instance is to be restored, and the secondary account is authorized to access that data in that environment. The access may be made by the control plane, acting on behalf of the secondary account, when it replays the transaction data to the restored database instance. For example, a control plane may access the transaction data based on the credentials or identity of the secondary account, and cause the transaction data to be replayed using interfaces provided by the database instance.

In an embodiment, the transaction data is marked as owned by the secondary account, and read access to the data is granted to the secondary account. Thus, while modifying or deleting the data may require dual authorization, the data can be read by the second account without the authorization of the first account. In some instances, the access is performed by the control plane acting on behalf of the secondary account.

At 606, the distributed system prevents the configuration and transaction data from being deleted, except by mutual authorization by both the primary and secondary accounts.

The data whose deletion is prevented may correspond to the data available to the secondary account, in order to sure that the secondary account retains the ability to access the data in the event that a restoration is called for. Preventing deletion can be implemented in a variety of ways. These include routing all requests to delete data through a control plane, so that the control plane can ensure that adequate authorization and validation is conducted. Preventing deletion can also comprise setting appropriate file-level security attributes so that the data cannot be deleting without the participation of the control plane.

At 608, the distributed system invalidates the primary account in response to a compromise of the primary account. Note that this step is depicted in FIG. 6 as an example of a scenario in which the operational continuity safeguards described herein may be employed. It should not, however, be construed as limiting the scope of the present disclosure to only those cases and embodiments in which this scenario has occurred. Moreover, as explained in more detail below, there may be cases where the primary account is not invalidated. The primary account may, in some cases, continue to be operational after the database instance is restored to another account.

In some cases and embodiments, invalidating the primary account severs the linkage between the primary account and the secondary account, and allows the secondary account privileges previously held jointly between the primary and secondary accounts. These steps may, for example, be undertaken by a control plane or by an identity management service.

In some cases and embodiments, invalidating the primary account deactivates the primary account. The deactivation may be temporary. These steps may, for example, be undertaken by a control plane or by an identity management service.

In some cases and embodiments, the primary account is not invalidated in response to being compromised. Instead, the primary account is restored with new account credentials. These steps may, for example, be undertaken by a control plane or by an identity management service.

In some cases and embodiments, the primary account is not invalidated in response to being compromised. Instead, in some cases the primary account is restored, along with other aspects of the database instance and its operating environment. These steps may, for example, be taken by a control plane during a process for restoring a database instance, as described herein. Also note that in some cases and embodiments, restoration can occur without interrupting the operation of the original database instance and/or primary account.

At 610, the distributed system restores the database instance using the secondary account. Thus, in response to a request to instantiate a replica of the database instance, the distributed system creates another database instance by accessing the replicated configuration and transaction data. Although the distributed system requires dual authorization to modify or delete account, configuration, and transaction data related to the restoration capability, the distributed system permits the secondary account to independently read this information in order to create an operating environment and restore the database instance.

Figure 8:
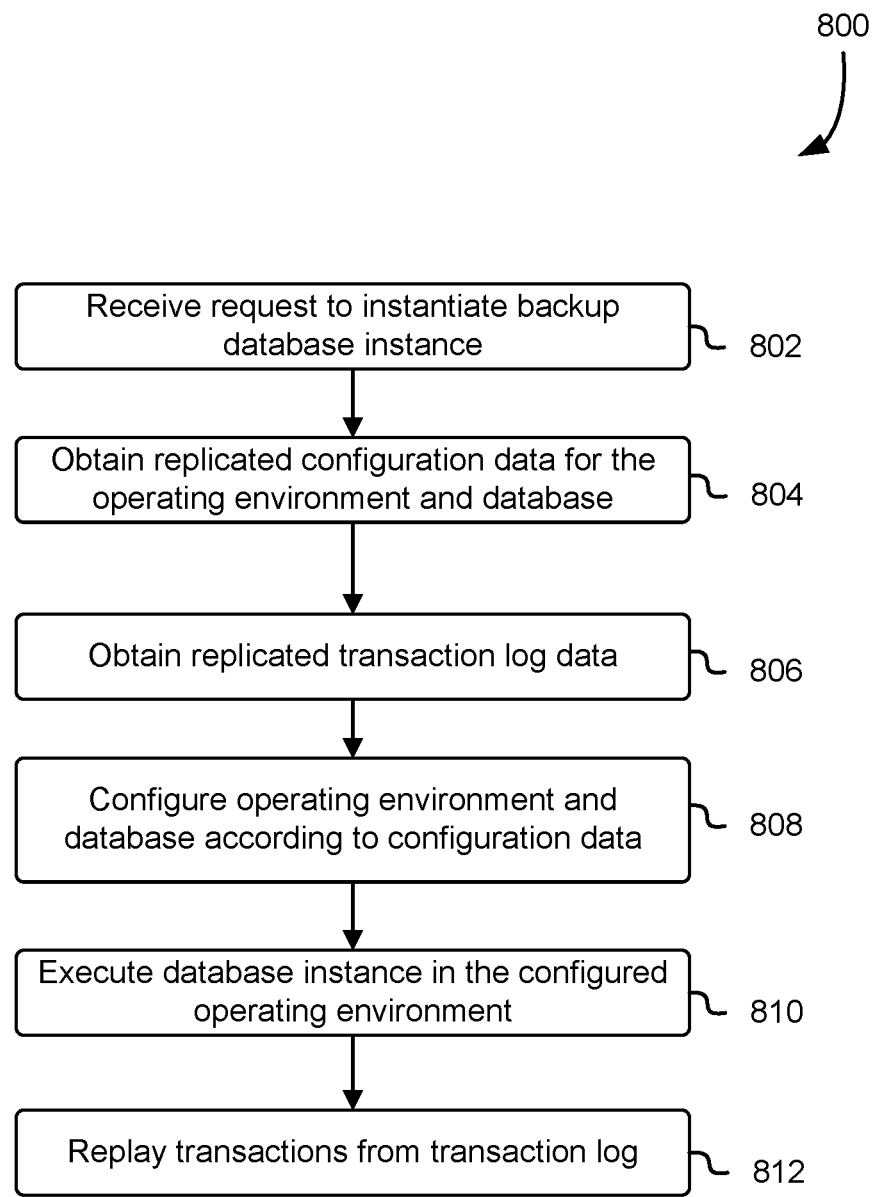
FIG. 8 is a flow diagram illustrating an example process for performing a point-in-time database restoration, in accordance with an embodiment.

Using processes described herein, for example with respect to FIG. 8, the distributed system can restore the database instance to another operating environment. The data used to restore the instance, including records of relevant configuration data and transaction data, can be accessed from storage using the credentials of the second account.

The operational continuity safeguards may, in some cases and embodiments, remain active after a database has been restored. For example, the restored database instance might resume operations with continuity enabled via linkage to a third account. In another example, the operation of the original database instance is not interrupted, and it's operational continuity features remain in place, after the original database instance is restored to another operating environment.

FIG. 7 is a flow diagram illustrating an example process for enabling a point-in-time database restoration capability, with delayed instantiating of the backup instance, in accordance with an embodiment. Although FIG. 7 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The example process 700 may be performed by a distributed system, such as the data distributed system 100 depicted in FIG. 1. In some embodiments, the depicted steps are performed or initiated by a control plane of the distributed system 100, such as the control plane 106a depicted in FIG. 1.

At 702, the control plane receives or otherwise obtains a request to enable a point-in-time restoration capability for a database instance, where the restoration capability is protected by operational continuity safeguards.

In embodiments, the restoration capability is provided with no backup instance being created, unless and until such an instance is requested. A backup instance refers to a node or instance of the database, such as a read replica of a database that processes the same transactions as the database instance, or a subset thereof. Instantiating the backup instance refers to executing the instance. As a consequence of not immediately instantiating the backup instance, the technical and monetary costs associated with executing such an instance is not incurred until and if such an instance is needed.

The operational continuity safeguards are associated with two accounts. A first account, which may be referred to as a primary account, is associated with the operation of the database instance for which the restoration capability is being enabled. A second account, which may be referred to as a secondary account, is used to act as a joint owner of account, configuration, and/or transaction data produced by the database instance. The secondary account is not necessarily limited to this role, however.

At 704, the control plane obtains configuration data for the operating environment and database instance. The operating environment refers to the operating environment in which the database instance is executing, or alternatively the operating environment in which the primary database instance will execute, in cases where restoration capability is requested when the database instance is initially configured. The configuration data is stored with information indicating that it is jointly owned by both the primary and secondary accounts, and as such is protected from deletion except where the distributed system obtains authorization from both of the primary and secondary accounts.

In an embodiment, the control plane obtains configuration data by recording snapshots of the database instance and of the computing device and/or virtual machine on which the database instance executes.

In an embodiment, the control plane obtains configuration data by monitoring changes made to the operating environment. For example, configuration changes to the operating environment may be routed through the control plane. The control plane can then store records of the configuration changes. In some instances, the control plane may initiate or facilitate configuration changes, and can record them.

In an embodiment, the control plane maintains metadata indicative of configuration aspects on which the database is dependent. For example, the control plane may store metadata indicative of configuration changes that have been made by or routed through the control plane. The metadata may further indicate which of these changes are pertinent to the operation of the database, and on which the database may therefore be considered dependent. The metadata might also provide means of identifying relevant configuration changes to an operating system or database configuration.

In an embodiment, the distributed system marks as jointly owned the aspects of configuration that are indicated by the metadata as being related to the operation of the database. In this manner, aspects of the configuration which may be relevant to the database instance are preserved for subsequent application to an operating environment in which a restored database can operate.

At 706, the control plane initiates maintenance of transaction data on replicated storage. In this step, initiating maintenance refers to an ongoing basis to copy transaction data to a replicated storage location, such as a storage service accessible to the operating environment in which the original database instance is executing. The distributed system stores the transaction data with information indicating that it is jointly owned by both the primary and secondary accounts, and as such is protected from deletion except where the distributed system obtains authorization from both of the primary and secondary accounts.

In an embodiment, the control plane initiates maintenance of the transaction data by launching a thread or executable process which copies transaction data to a replicated storage location, such as a storage service with replication features. In an embodiment, the control plane monitors the transaction log for new entries, and copies the new transaction data to replicated storage. The data can be marked as jointly owned by the primary and secondary accounts.

In another embodiment, the control plane monitors a directory or other storage location for new transaction log files, and copies the new files to replicated storage. Alternatively, the thread or process may periodically copy a transaction log, or a portion thereof, to replicated storage. The transaction data, however stored, may protected by the distributed system from deletion except where authorization can be obtained from both of the primary and secondary accounts.

The replicated storage refers to a storage service that has replication features, including the ability to generate and store a copy of the files or other data stored on the service. For example, storage service with replication features may automatically store copies of data in at least two geographic regions. The transaction data copied to the replicated storage is therefore replicated in accordance with the replication features of the service. Alternatively, the replicated storage refers to a storage system or storage device that is replicated to another operating environment by the operating of control planes in the respective environments.

At 708, the control plane stores the configuration data for the operating environment and database instance on the replicated storage. This information may then be replicated to another location for use in a restoration of the primary database instance. This information may be replicated so that any information that indicates it should not be deleted without mutual authorization is preserved when it is replicated. Alternatively, it make be replicated to a location in which it is protected from deletion without mutual authentication.

At 710, the control plane configures replication to the target operating environment. When a client requests that a restoration capability be enabled, they may also specify one or more target operating environments. A target environment refers to an environment in which the database might be restored. For example, if the primary database instance operates in an operating environment geographically located on the West Coast, a target environment for restoring the database might be specified as the East Coast. This step may be optional, in the sense that the storage service may have replication features do not require such configuration. Also note that the replication may not always be to the target operating environment, but rather to a location that is accessible to the target operating environment.

Embodiments may configure the features of replication in accordance with requested attributes of the restoration. An example of such an attribute is latency of replication, since the ability to restore a database instance may depend on how long the data takes to replicate to the operating environment in which the database is to be restored. In some cases, replicating the data to the target environment helps to minimize the time needed to restore the database, since the transaction log and configuration data will have been transferred to the target operating environment prior to the restoration request.

Another aspect of replication involves ownership of the replicated data. Ownership refers to the account, or accounts, that can read or modify the replicated data. In an embodiment, the replication is configured to associate the replicated data with the same account used in conjunction with the primary database instance in the original operating environment. In another aspect, the replicated data is associated with another account that is used only in a target environment. In another aspect, the replicated data cannot be modified or deleted (but may be accessed) without approval from both accounts. In the absence of approval, the system prevents the replicated data from being modified or deleted.

FIG. 8 is a flow diagram illustrating an example process for performing a point-in-time database restoration, in accordance with an embodiment. Although FIG. 8 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The example process 800 may be performed by a distributed system, such as the distributed system 100 depicted in FIG. 1. In some embodiments, the depicted steps are performed or initiated by a control plane of the distributed system 100, such as the control plane 106a depicted in FIG. 1.

At 802, the distributed system receives a request to instantiate a backup database instance. As noted, the instantiation of the backup database instance occurs when the restoration is requested, rather than when the client requests that the restoration capability be enabled. A control plane in an active operating environment may receive the request. If not in the target operating environment, the control plane that received the request may then forward it to the control plane in the target operating environment.

In an embodiment, metering the capacity utilized for executing the restored instance is initiated in response to receiving the request to instantiate the backup instance, e.g., once the backup instance has become operable. Prior to the request, no such costs are associated with the backup instance. There may, however, be costs associated with monitoring, storing, and replicating transaction log and configuration data. The metering may be initiated by the control plane after receiving the request and completing the instantiation of the restored instance. The control plane may, for example, begin collecting data pertaining to how much data is read from or written to the restored database instance, and store records associating those activities with a corresponding account.

In an embodiment, the distributed system configures the operating environment and database by accessing configuration and replication data based on the credentials of the secondary account. For example, the control plane may verify that the request to perform the restoration was obtained from interactions with a user interface or invocations of application programming interface in which the credentials of the secondary account were provided. In embodiments, the control plane may verify that files, records, or other data accessed during the restoration process is associated with the secondary account. In some embodiments, security features of the operating system may be leveraged to indicate and confirm that the secondary account is an owner of the data accessed during the restoration, and to prevent accounts other than the primary and secondary accounts from accessing the data.

At 804, the distributed system obtains the replicated configuration data for the operating environment and database. The information is accessed based on authorization associated with the second account. In an embodiment, a control plane operating in a second operating environment obtains configuration data for a first operating environment. In an embodiment, the control plane identifies data relevant to the database instance (for example, based on account information, a database instance identifier, an operating environment identifier, and so forth) and retrieves the corresponding configuration information from a storage device or service accessible in the second operating environment. The information may be included in the received request to restore the database instance. Once identified based on this information, the data can be retrieved from a storage location accessible to the second operating environment.

At 806, the distributed system obtains the replicated transaction log data. The data is accessed based on authorization associated with the second account. In an embodiment, the control plane in the target operating environment retrieves the transaction data from a storage service. On the storage service, the transaction data is identified based on a naming pattern or identification system that incorporates information such as account number, database instance identifier, operating environment identifier, and so forth. The information that identifies the transaction data that may be included in the request to restore the database instance. The data may be stored on the storage service with information indicating that it can be accessed based on the secondary account.

At 808, the distributed system configures the operating environment and database according the obtained configuration data. In an embodiment, this is done via a control plane in the second operating environment. For example, the configuration information may be structured as a collection of configuration logs and snapshots. The configuration logs may describe a series of changes made to the first operating environment. The logs may include information indicating when the configuration changes were made. The snapshot information can include database snapshots, virtual machine snapshots, and so forth, and may be associated with information indicating when the snapshots were taken. Using the time information, the control plane may apply relevant configuration changes up to the desired time for the point-in-time restoration. Similarly, snapshots current as of the indicated restoration time may also be used. In this manner, the configuration of the first operating environment can be recreated in the second operating environment, to the extent necessary to allow the restored database to run in the second environment.

At 810, the distributed system executes the new database instance in the target operating environment. This may be done via inter-process communication between the control plane in the target environment and the operating system of the computing device or virtual machine on which the database instance is to be executed on.

At 812, the distributed system replays the transaction from the transaction log. Replaying the transaction log refers to causing the new database instance to process the transactions represented by entries in the transaction log. In an embodiment, the control plane initiates the replaying by sending a command to the new database instance. The command indicates that the database instance should replay entries in a transaction log, and provides a location where the database instance can access the log.

Figure 9:
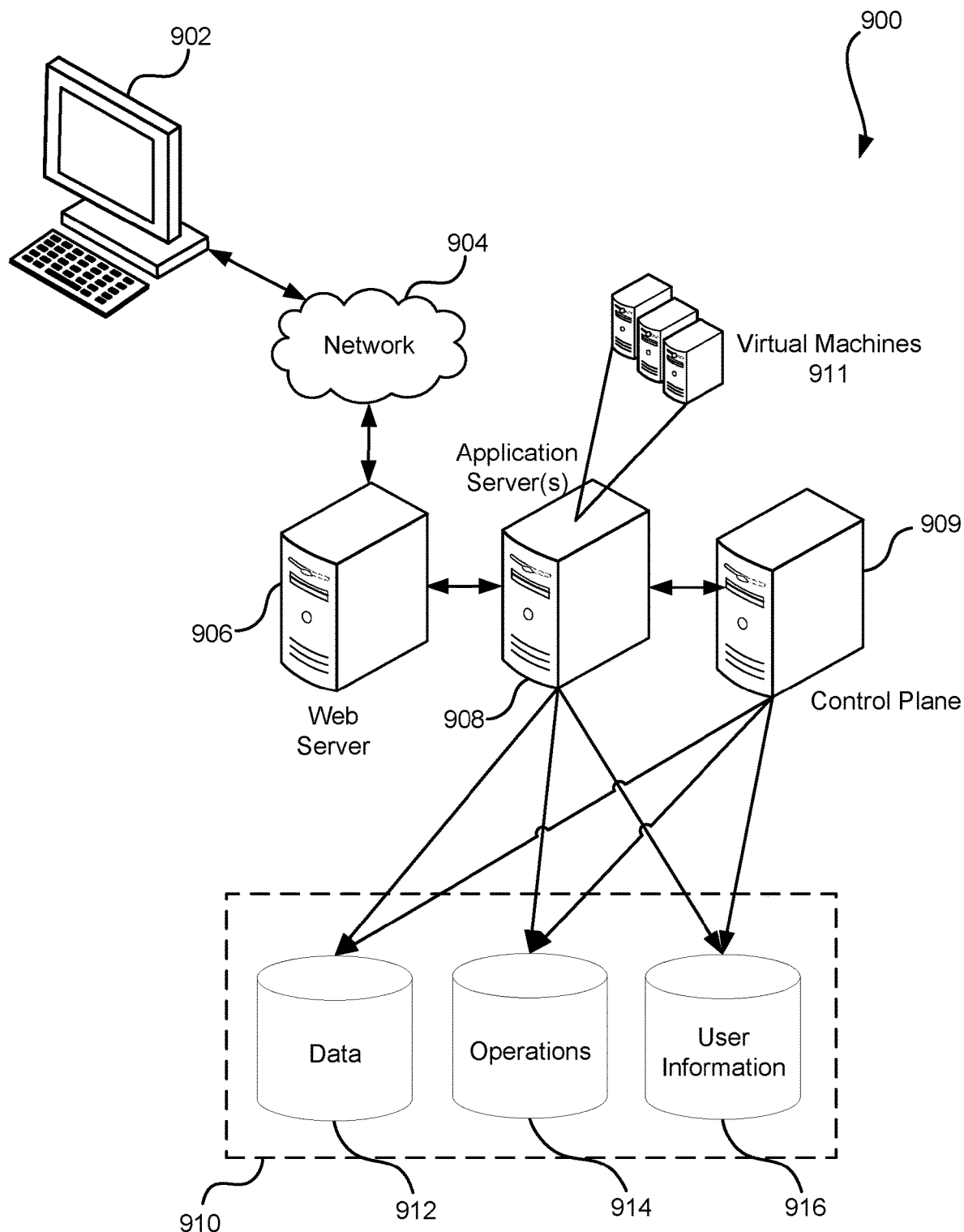
FIG. 9 illustrates a system in which various embodiments can be implemented.

FIG. 9 is a flow diagram illustrating an example process for operating a distributed system with operational continuity safeguards for a database instance, in accordance with an embodiment. Although FIG. 8 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The example process 800 may be performed by a distributed system, such as the distributed system 100 depicted in FIG. 1. In some embodiments, the depicted steps are performed or initiated by a control plane of the distributed system 100, such as the control plane 106*a* depicted in FIG. 1.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server(s) 908, a control plane 909, and a data store 910. It should be understood that there can be several application servers, control planes, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server(s) 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

In an embodiment, the control plane 909 performs operations to coordinate the activities and operation of components within the system 900. The control plane may comprise a computing device with at least one processor, one or more non-transitory memories, and instructions that, in response to being executed, perform operations of a control plane as described herein. The control plane 909 may further comprise one or more network interfaces for communicating with the web server 906, application server(s) 908, and data store 910.

The control plane 909, in various embodiments, is configured to have access to information not accessible to the web server 906 and/or application server(s) 908. This information may include aspects of user information 916, such as credentials, certificates, account and billing information, system configuration data, and so forth.

The control plane 909, in various embodiments, manages the allocation and configuration of the application server(s) 908 and virtual machines 911. The virtual machines 911 operate on the application server(s) 908. In various embodiments, when a computing resource, such as a database instance, is requested within an operating environment, the control plane 909 identifies an application server(s) 908 with sufficient available capacity and assigns it to execute a virtual machine. The control plane 909 then configures the virtual machine, including performing steps to ensure that software (such as software for a database instance) is installed.

In various embodiments, the control plane 909 can perform operations to configure communications networks. For example, the control plane 909 can configure communications between the web server 906 and application server(s) 908. The control plane 909 may also configure routers, gateways, and other devices in order to provide and secure communications between the web server 906, application server(s) 908, and client device 902.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing data 912 and user information 616, which are used to serve content. The data store also is shown to include a mechanism for storing operations data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server(s) 908 and obtain, update or otherwise process data in response thereto and the application server(s) 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network. These non-virtual devices operate on physical computing devices, such as the depicted application servers.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   a memory that stores computer-executable instructions that, in response to being executed by the at least one processor, cause the system to:
   receive a request to enable a restoration capability for a first database instance;
   begin replication of at least one of configuration or transaction data of the first database instance, wherein the first database instance is associated with a first account;
   store information associating the configuration and transaction data with a second account;
   protect against termination of the replication of configuration and transaction data in the absence of approval of the termination from both the first account and the second account; and
   in response to a request to instantiate a replica of the first database instance, create a second database instance based at least in part on access to the replicated configuration and transaction data, the access authorized by the second account.

2. The system of claim 1, wherein approval of the termination is based at least in part on credentials for the first account and credentials for the second account.

3. The system of claim 1, wherein the computer-executable instructions, in response to execution by the at least one processor, cause the system to defer modification of an attribute of the first account until approval is obtained from the second account.

4. The system of claim 1, wherein the request to instantiate the replica comprises information indicative of a point-in-time for restoring the first database instance.

5. A computer-implemented method, comprising:
   beginning preservation of at least one of configuration or transaction data of a first database instance, the first database instance associated with a first account;
   storing information associating the configuration and transaction data of the first database instance with a second account;
   preventing termination of the preservation in the absence of approval of the termination from both the first account and the second account; and
   creating a second database instance based at least in part on the configuration and transaction data, the configuration and transaction data accessed based at least in part on the second account.

6. The method of claim 5, further comprising:
   providing a first user interface operative to obtain a request to enable a capability to restore the first database instance, wherein the first user interface obtains the request on behalf of the first account; and
   providing a second user interface operative to confirm the request to enable the capability, wherein the second user interface confirms the request on behalf of the second account.

7. The method of claim 5, wherein approval of the termination is based at least in part on validating credentials for the first account and validating credentials for the second account.

8. The method of claim 5, further comprising:
   authorizing modification of the configuration and transaction data based at least in part on approval of the modification from both of the first and second accounts.

9. The method of claim 5, further comprising:
   authorizing deletion of the configuration and transaction data based at least in part on approval of the deletion from both of the first and second accounts.

10. The method of claim 5, further comprising:
    receiving a request to modify an attribute of the first account; and modifying the attribute of the first account based at least in part on the request and based at least in part on obtaining approval for the modification from the second account.

11. The method of claim 5, further comprising:
assigning, to a file comprising at least one of configuration or transaction data, an identifier indicative of the second account jointly owning the file.

12. The method of claim 5, wherein a control plane stores the transaction data in at least one file, the at least one file jointly owned by the first and second accounts.

13. The method of claim 5, further comprising:
creating the second database instance in a second operating environment associated with the second account.

14. A non-transitory computer-readable storage medium comprising executable instructions that, as a result of being executed by at least one processor of a computer system, cause the computer system to at least:
in response to a request to enable a restoration capability for a first database instance associated with a first account, initiate replication of at least one of configuration or transaction data of the first database instance;
store information associating the configuration and transaction data with a second account;
prevent termination of the replication of the configuration and transaction data based at least in part on a lack of approval of the termination from both the first account and the second account; and
in response to a request to restore the first database instance, create a second database instance associated with the second account, the second database instance based at least in part on the replicated configuration and transaction data.

15. The non-transitory computer-readable storage medium of claim 14, comprising further instructions that, as a result of being executed by the at least one processor, cause the computer system to at least approve of the termination based at least in part on credentials for the first account and credentials for the second account.

16. The non-transitory computer-readable storage medium of claim 14, wherein the request to enable the restoration capability comprises information indicative of linking the capability to the second account.

17. The non-transitory computer-readable storage medium of claim 14, wherein the second database instance is created in an operating environment associated with the second account.

18. The non-transitory computer-readable storage medium of claim 14, wherein the executable instructions, in response to execution by the at least one processor, cause the system to prevent modification of the configuration and transaction data until approval for the modification is obtained from both of the first and second accounts.

19. The non-transitory computer-readable storage medium of claim 14, wherein credentials of the second account are stored in an escrow account.

20. The non-transitory computer-readable storage medium of claim 14, wherein the replication of the configuration and transaction data comprising marking the configuration and transaction data as jointly owned by the first and second accounts.

* * * * *